A. L. HOOVER.
TRUCK.
APPLICATION FILED MAR. 10, 1909.
981,761.
Patented Jan. 17, 1911.
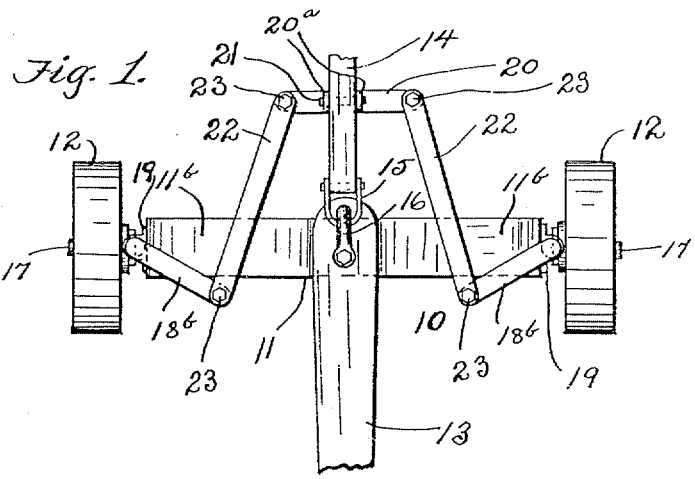
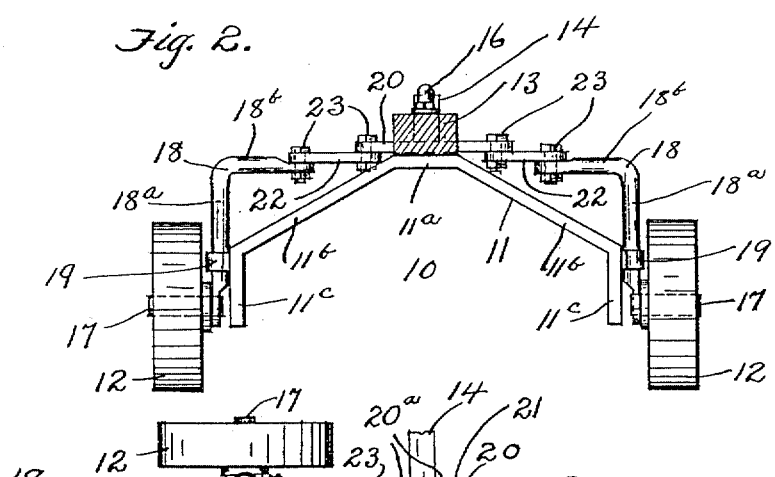
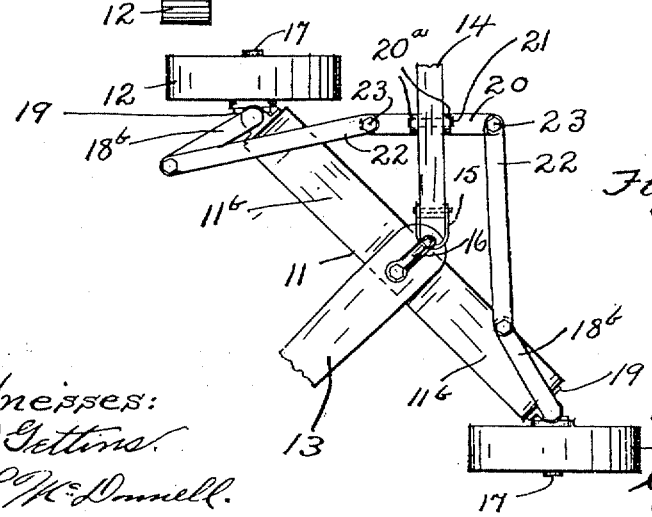
Witnesses:
H. I. Gettins.
H. L. McDonnell.
Inventor:
Arthur L. Hoover.
by Lynch & Dorr,
Attorneys.

UNITED STATES PATENT OFFICE.

ARTHUR L. HOOVER, OF AVERY, OHIO.

TRUCK.

981,761.

Specification of Letters Patent.

Patented Jan. 17, 1911.

Application filed March 10, 1909. Serial No. 482,618.

*To all whom it may concern:*

Be it known that I, ARTHUR L. HOOVER, a citizen of the United States of America, residing at Avery, in the county of Erie and State of Ohio, have invented certain new and useful Improvements in Trucks; and I hereby declare the following to be a full, clear, and exact description of the invention, such as will enable others skilled in the art to which it pertains to make and use the same.

This invention relates to trucks and particularly to the mechanism for turning the wheels of a truck relative to the truck frame so that a short or quick turn can be made.

The object of the invention is the provision of a truck and of a wheel turning mechanism which is simple in construction and which will permit the vehicle or machine connected to the truck to be readily turned in a very small space.

Although my improved truck and wheel turning mechanism is not limited to any special use or for drawing any special kind of machine or vehicle, it is particularly adapted for use in connection with such machines as large farming or harvesting implements which are drawn back and forth over the ground or field.

The invention may be briefly summarized as consisting in certain novel combinations and arrangements of parts which will be described in the specification and set forth in the appended claims.

In the accompanying drawing Figure 1 is a plan view of a truck and wheel turning mechanism constructed in accordance with my invention and showing portions of the tongue and of the draw or coupling bar which is connected to the truck at its forward end and is designed to be secured to the machine or vehicle to be drawn. Fig. 2 shows the same in a front elevation with the tongue in section. Fig. 3 shows the arrangement of the parts when the truck is turned through an angle of forty-five degrees from normal position.

Referring now to the figures of the drawing, 10 represents as a whole the truck which is provided with a frame 11 in the form of a yoke which carries in a manner to be described wheels 12 and has rigidly secured to its central portion the tongue 13. Pivotally or loosely connected to the truck, in this case to the rear end of the tongue 13, is a draw or coupling bar or beam 14 which may extend to the rear truck of a vehicle or may be attached to any kind of a machine which is designed to be drawn along the ground. In the present case the bar 14 is connected to a truck by means of a clevis 15 on the forward end of the bar and by a suitable hook or eye 16 on the rear end of the tongue.

The frame 11 may be of any suitable construction as long as it answers the necessary requirements, but in the present case is formed of a bar which is provided at the center with a short horizontal portion 11$^a$ to which the tongue 13 is secured, with portions 11$^b$ inclined downwardly and outwardly from the central portion 11$^a$ and with downwardly projecting end portions 11$^c$ which support the wheels 12 by means now to be described.

The wheels are mounted upon short studs or axles 17 each of which is carried by and is preferably rigidly secured, at its inner end, to the lower end of an elbow-shaped lever or arm 18 having a downwardly extending portion 18$^a$ which carries the stud 17 and is supported in a manner such that it can rotate or turn but not move longitudinally, in a suitable strap or bearing member 19 carried by the corresponding end 11$^c$ of the yoke or truck frame 11. The arm 18 is also provided at its upper end with a portion 18$^b$ which is at right-angles to the portion 18$^a$, and when the truck is in its normal position, is horizontal and extends inwardly and forwardly as is shown clearly in the drawing. Thus it will be seen that when the arms 18$^a$ are turned in their bearings 19, the wheels 12 will be turned with respect to the truck frame.

Secured to the draw or coupling bar 14, a short distance from the forward end thereof, is a cross bar 20 which is secured to said bar preferably by means of flanges 20$^a$ which extend upwardly on opposite sides of the draw bar 14, and by means of a cross pin or bolt 21 which extends through the draw bar and through the flanges 20$^a$. In order that the wheels 12 may be turned with respect to the truck when the latter is turned with respect to the draw bar 14, the outer ends of the cross bar 20 are connected by means of links 22 to the free ends of the portions 18$^b$ of the two elbow arms or levers 18 respectively, the ends of the elbow arms or levers 18 being flattened, and the links being pivotally connected to the ends of the cross bar and to the ends of the elbow levers by pins or bolts 23.

The purpose and functions of the parts described will now be explained. When the truck is drawing the machine or vehicle to which the bar 14 is connected, straight ahead, the wheels will occupy a position such that they are at right-angles to the truck frame. If, however, the truck is turned with respect to the draw bar 14 in one direction or the other, the links 22 will cause the elbow arms or levers 18 to be turned in their bearings so as to turn the wheels faster or through a greater angle than the truck is turned but in the same direction that the truck is turned. It will be obvious that the angle through which the wheels are turned with respect to the truck will depend upon the proportions of the parts of the wheel turning mechanism, and more particularly to the effective lengths of the portions $18^b$ of the elbow arms or levers 18. I prefer to proportion the parts so that the wheels will be turned through an angle twice as great as the angle through which the truck is turned, although of course this may be varied to suit the requirements.

What I claim is,—

1. In a device of the character described a frame having a vertically arranged journal at each end thereof, a pair of elbow-shaped levers, each lever having one leg extending down into one of said journals and the other extending inwardly over said frame, ground wheels arranged on studs on the lower ends of the downwardly extending legs of said levers, a draw bar pivotally connected to said frame and adapted to be attached to the vehicle to be drawn along the ground, a cross bar rigidly secured to the draw bar and extending beyond opposite sides thereof, a pair of links pivoted to the ends of the cross bar and to the ends of the inwardly extending leg portions of said levers and a tongue rigidly secured to said frame.

2. In a device of the character described the combination of a frame in the shape of a yoke, a tongue rigidly secured to the middle of said yoke, vertically arranged journals mounted on the outer sides of the downwardly extending portions of the yoke, a pair of elbow-levers, each lever having one leg extending down into one of said journals and the other leg extending inwardly over said frame, outwardly extending studs carried by the lower ends of the downwardly extending legs of said levers, ground wheels journaled on said studs, a draw bar pivotally connected to the frame, a cross bar rigidly secured to said draw bar and extending beyond opposite sides thereof and a pair of links pivotally connected to the ends of said cross bar and to the inner ends of the inwardly extending legs of said levers, the arrangement being such that when the tongue and the frame is turned through a certain angle the wheels will turn in the same direction through a greater angle.

In testimony whereof, I sign the foregoing specification, in the presence of two witnesses.

ARTHUR L. HOOVER.

Witnesses:
VICTOR C. LYNCH,
N. L. McDONNELL.